(12) United States Patent
Gately et al.

(10) Patent No.: US 10,294,009 B2
(45) Date of Patent: May 21, 2019

(54) CLEANING LIQUID DISPENSING SYSTEM

(71) Applicant: Conopco, Inc., Englewood Cliffs, NJ (US)

(72) Inventors: John Declan Gately, Bebington (GB); James Garfield Pryor, Slough (GB); Elizabeth Jane Smith, Chester (GB)

(73) Assignee: Conopco, Inc., Englewood Cliffs, NJ (US)

( * ) Notice: Subject to any disclaimer, the term of this patent is extended or adjusted under 35 U.S.C. 154(b) by 0 days.

(21) Appl. No.: 15/543,020

(22) PCT Filed: Jan. 13, 2016

(86) PCT No.: PCT/EP2016/050583
§ 371 (c)(1),
(2) Date: Jul. 12, 2017

(87) PCT Pub. No.: WO2016/113317
PCT Pub. Date: Jul. 21, 2016

(65) Prior Publication Data
US 2018/0022531 A1 Jan. 25, 2018

(30) Foreign Application Priority Data
Jan. 16, 2015 (EP) .................................... 15151533

(51) Int. Cl.
*B65D 83/00* (2006.01)
*B65D 75/58* (2006.01)
(Continued)

(52) U.S. Cl.
CPC ....... *B65D 83/0055* (2013.01); *B65D 25/205* (2013.01); *B65D 43/163* (2013.01);
(Continued)

(58) Field of Classification Search
CPC .. B65D 83/0055; B65D 51/245; B65D 77/06; B65D 47/08; B65D 43/163; B65D 25/205; B65D 75/5883
See application file for complete search history.

(56) References Cited

U.S. PATENT DOCUMENTS 3,235,127 A 2/1966 Cline
3,255,932 A 6/1966 Hunter et al.
(Continued)

FOREIGN PATENT DOCUMENTS

AT 382838 4/1987
AU 198434976 5/1985
(Continued)

OTHER PUBLICATIONS

Search Report and Written Opinion in EP15151532, dated Apr. 8, 2015.
(Continued)

*Primary Examiner* — Donnell A Long
(74) *Attorney, Agent, or Firm* — Gerard J. McGowan, Jr.

(57) ABSTRACT

A cleaning liquid dispensing system (1) comprising the combination of a re-usable container (3) and a replaceable spouted pouch (5) wherein (i) the spouted pouch comprises a flexible pouch body (7) containing a cleaning liquid which dispenses from a rigid pouch spout (9); and (ii) the container is rigid and comprises a pouch chamber (11) for holding said spouted pouch, and a pour spout (17), wherein the rigid pouch spout and the container comprise respective engagement members (15) by which engament the pouch spout is in fluid communication with the container pour spout to allow dispensing of the cleaning liquid stored in the flexible pouch body.

10 Claims, 6 Drawing Sheets

(51) Int. Cl.
  *B65D 77/06* (2006.01)
  *B65D 25/20* (2006.01)
  *B65D 43/16* (2006.01)
  *B65D 47/08* (2006.01)
  *B65D 51/24* (2006.01)

(52) U.S. Cl.
  CPC .......... *B65D 47/08* (2013.01); *B65D 51/245* (2013.01); *B65D 75/5883* (2013.01); *B65D 77/06* (2013.01); *Y02W 30/807* (2015.05)

(56) References Cited

U.S. PATENT DOCUMENTS

| | | | |
|---|---|---|---|
| 3,809,290 | A | 5/1974 | Schmit |
| 4,441,631 | A | 4/1984 | Hosie |
| 5,421,485 | A | 6/1995 | Furuta et al. |
| 5,454,483 | A | 10/1995 | Ichikawa et al. |
| 5,669,519 | A | 9/1997 | Notz et al. |
| 6,454,134 | B1 | 9/2002 | Aujesky et al. |
| 7,175,050 | B1 * | 2/2007 | DeCottignies ...... B05B 11/0043 215/11.3 |
| D600,063 | S | 9/2009 | Harbutt et al. |
| D616,242 | S | 5/2010 | Twycross |
| 2001/0000398 | A1 | 4/2001 | Makino et al. |
| 2003/0198502 | A1 | 10/2003 | Maloney et al. |
| 2010/0213211 | A1 | 8/2010 | Whaling et al. |
| 2012/0085782 | A1 | 4/2012 | Futori |
| 2012/0145710 | A1 | 6/2012 | Corbett et al. |
| 2012/0168461 | A1 | 7/2012 | Topits et al. |
| 2012/0248117 | A1 | 10/2012 | Corbett et al. |
| 2015/0284143 | A1 | 10/2015 | Herisson |
| 2018/0022531 | A1 | 1/2018 | Gately |

FOREIGN PATENT DOCUMENTS

| | | |
|---|---|---|
| CA | 2160386 | 4/1997 |
| CA | 2524957 | 5/2006 |
| CN | 203410790 | 1/2014 |
| CN | 104229302 | 12/2014 |
| CN | 104340502 | 3/2017 |
| DE | 7926069 | 12/1979 |
| DE | 4120048 | 12/1992 |
| DE | 19512477 | 8/1996 |
| EP | 0241632 | 10/1989 |
| EP | 645320 | 3/1995 |
| EP | 0556234 | 4/1995 |
| EP | 1106527 | 6/2001 |
| EP | 1798159 | 6/2007 |
| EP | 1888413 | 2/2008 |
| EP | 2216287 | 8/2010 |
| EP | 2397421 | 12/2011 |
| EP | 2752373 | 7/2014 |
| EP | 2599728 | 9/2014 |
| EP | 2323923 | 11/2014 |
| EP | 2837580 | 2/2015 |
| ES | 2498690 | 6/2015 |
| FR | 2326348 | 4/1977 |
| FR | 2772730 | 3/2000 |
| GB | 1452496 | 10/1976 |
| GB | 2281275 | 10/1997 |
| GB | 2451702 | 2/2009 |
| JP | 51106616 | 8/1976 |
| JP | 1058466 | 4/1989 |
| JP | J5072773 | 10/1993 |
| JP | 648465 | 2/1994 |
| JP | 6122455 | 5/1994 |
| JP | 6171668 | 6/1994 |
| JP | 8192872 | 7/1996 |
| JP | 995376 | 4/1997 |
| JP | 10101138 | 4/1998 |
| JP | 10101140 | 4/1998 |
| JP | 1149234 | 2/1999 |
| JP | 11227776 | 8/1999 |
| JP | 2000313477 | 11/2000 |
| JP | 2000335639 | 12/2000 |
| JP | 200163760 | 3/2001 |
| JP | 2001301768 | 10/2001 |
| JP | 200219836 | 1/2002 |
| JP | 2002240856 | 8/2002 |
| JP | 2003170962 | 6/2003 |
| JP | 2003192030 | 7/2003 |
| JP | 2004307039 | 11/2004 |
| JP | 200676586 | 3/2006 |
| JP | 200715742 | 1/2007 |
| JP | 200715743 | 1/2007 |
| JP | 2008013222 | 1/2008 |
| JP | 2009249011 | 1/2009 |
| JP | 2010159072 | 7/2010 |
| JP | 2010241505 | 10/2010 |
| JP | 20121262 | 1/2012 |
| JP | 2012106756 | 6/2012 |
| JP | 2013136390 | 7/2013 |
| JP | 2013139302 | 7/2013 |
| WO | WO9208658 | 5/1992 |
| WO | WO0018650 | 4/2000 |
| WO | WO0228734 | 4/2002 |
| WO | WO2010025392 | 3/2010 |
| WO | WO2012102814 | 8/2012 |
| WO | WO2013103589 | 7/2013 |
| WO | WO2014091129 A1 | 6/2014 |
| WO | WO2014120760 | 8/2014 |
| WO | WO2014144819 | 9/2014 |
| WO | WO2014199288 | 12/2014 |
| WO | WO2015028564 | 3/2015 |

OTHER PUBLICATIONS

Search Report and Written Opinion in EP15151533, dated Aug. 5, 2015.
Search Report and Written Opinion in PCTEP2016050575, dated Mar. 24, 2016.
Search Report and Written Opinion in PCTEP2016050583, dated Mar. 24, 2016.
Co-pending Application: Applicant: Benson et al., U.S. Appl. No. 15/543,015, filed Jul. 12, 2017.

* cited by examiner

CLEANING LIQUID DISPENSING SYSTEM

The present invention relates to re-usable dispensing devices for pouched liquid cleaning products, in particular but not exclusively for spouted pouches containing laundry liquid cleaning compositions which require measured dispensing.

The objective of the present invention is to provide improved packaging which incorporates spouted pouches to be dispense cleaning liquids in accurate, measured doses.

Accordingly, in a first aspect of the present invention there is provided a cleaning liquid dispensing system comprising the combination of a re-usable container and a replaceable spouted pouch wherein
(i) the spouted pouch comprises a flexible pouch body containing a cleaning liquid which dispenses from a rigid pouch spout; and
(ii) the container is rigid and comprises a pouch chamber for holding said spouted pouch, and a pour spout,
characterized in that the rigid pouch spout and the container comprise respective engagement members by which engagement the pouch spout is in fluid communication with the container pour spout to allow dispensing of the cleaning liquid stored in the flexible pouch body.

In a second aspect of the present invention there is provided a re-usable, rigid container for dispensing a cleaning liquid from a spouted pouch, the container comprising a pouch chamber and a pour spout and a handle characterized in the further provision of multiple engagement members for engagement with the rigid pouch spout by which said pouch spout is in fluid communication with the pour spout to allow dispensing of the cleaning liquid stored in the flexible pouch body.

In a third aspect there is provided a spouted pouch for use with a re-usable, rigid container, and comprising a flexible pouch body containing a cleaning liquid which dispenses from a rigid pouch spout and characterized in the provision of an engagement member for engagement with a respective engagement member of the rigid container by which the pouch spout is in fluid communication with the pour spout to allow dispensing of the cleaning liquid stored in the flexible pouch body.

With this arrangement, a cleaning liquid can be dispensed easily and accurately from a flexible, thin-walled (and therefore more environment friendly) pouch by locating the pouch in a re-usable rigid container. Less material can be used in packaging manufactured in large numbers and purchased regularly by the consumer but without the disadvantages of such packaging for the consumer who does not want to simply empty its contents but needs to dispense small, amounts repeatedly on different occasions over a period of time. This can be difficult to achieve controlled pouring from an unwieldy pouch due to the fluidity of the body. However when this pack is used within the system of the invention it is possible to achieve controlled pouring from the pour spout into a selected, small location such as a measuring cup or 'shuttle' or machine drawer or directly to a fabric stain prior to hand scrubbing/pre-treatment.

The container preferably comprises one or more walls, and may comprise multiple side walls. The container may be a jug or pitcher type construction and include a handle. The container is preferably generally ellipsoid in cross section. This advantageously provides a less bulky container.

The handle is preferably located on another e.g. opposing or adjacent (top) side to a pour spout. Generally the container is an upright body with upright longitudinal axis with a lid which may be in a generally transverse section/plane (but which need not be planar or indeed flat).

Preferably the container and pouch spout comprise respective pairs of rigid engagement members, and more preferably these engage along substantially orthogonal and intersecting axis.

Preferably the rigid engagement members comprise a respective pair of locating members, which locate the spout in a position whereby a second pair: the fluid communication members can be engaged for fluid intercommunication therebetween. Preferably the locating pair engage in a transverse direction relative to the container's longitudinal axis Preferably the container comprises a lid which is operable to overlie an aperture in the spout chamber and also includes the container pour spout.

Preferably the lid is hinged relative to the spout chamber such that it is pivoted between a first 'closed' position in which it overlies the aperture in the pouch chamber and a second 'open' position in which it lies in an upright plane. However the lid may also be a separate component. Preferably the respective engagement members of the container and the pouch spout engage via snap-fit engagement. More preferably the container engagement member comprises a recess in an upper part e.g. on or adjacent a perimeter or upper section of one side of the pouch chamber, said recess being configured to receive the rigid pouch spout in snap-fit engagement.

The recess is preferably shaped to correspond with the circumferential shape of the pouch spout engagement member. Preferably the recess is generally C-shaped (in plan view with the container resting upright on a level surface) and comprise an annular opening or gap to allow respective pouch spout engagement member to be pushed (by sliding transformation movement) into the recess.

Preferably the lid is lockable in the closed and/or open positions. This may be effected by locking members on the lid and pouch chamber.

The container preferably comprises a lid engagement member, on the lid. The lid engagement member is preferably configured for snap it engagement with the pouch spout in a direction orthogonal to the direction of forces driving engagement of the pouch spout and container engagement member. Preferably the lid engagement member engages with the pouch spout for fluid communication therebetween. Preferably the lid engagement member and the lid engagement member may, during engagement actuate an opening mechanism of the pouch spout.

Preferably the container engagement members and/or the engagement member of the pouch spout comprise a resilient material, e.g. plastic.

Preferably the lid engagement member engages when the lid overlies the aperture. More preferably the engagement is actuated by the locating e.g. pivoting of the lid to overlie the aperture.

The pouch spout engagement member is preferably a collar which engages with the recess in the container, these two components forming a pair of locating engagement members. Preferably the pouch spout collar is on a upper part of the pouch spout, adjacent any pouch opening. Preferably the collar is above any pouch spout weld fins/ribs. In this way the pouch spout can be located deeper into the pouch chamber and the lid can be flatter.

Preferably the container/lid and pouch engagement members comprise corresponding visual and/or tactile indicia e.g. colouring, texturing etc. to confirm correct engagement with the container/lid engagement member.

The adaption of the pouch for such a container is very elegant and simple and so impact on pouch manufacture/material usage is minimal.

The flexible pouch body is preferably has a generally oval cross (transverse) section, and may be formed by two walls sealed together along wall perimeters or one wall folded and sealed, along remaining wall perimeters and presenting a front face and a rear face bounded by common side edges. The pouch can have a very simple material/construction and so complicated base or gusset features to provide self-standing features are not necessary. The pouch may therefore be manufactured much cost effectively marketed with greater freedom as to orientation. Without the need for a base part, the pouch may provide a more advantageous shape for artwork.

Preferably the pouch spout is located on a side of the pouch. The side may comprise a flat seam.

The pouch spout may comprise a removable lid. The pouch spout may further comprise a secondary closure such as a flexible seal or tamper-evident locking mechanism.

The liquid composition may be any multi-dose fabric/laundry or hard surface washing or treatment composition. As used herein, the term "laundry" is intended to include, without limitation, fabric cleaning, care, and conditioning compositions.

The dispenser can be used to dispense a portion of the composition stored in the pouch chamber into a washing machine or washing receptacle. The collapsed pouch is contained in the rigid container and therefore does not hamper future dispensing operations.

In a further aspect the invention provides a method of dispensing a cleaning liquid using a dispensing system comprising the combination of a re-usable container and a replaceable spouted pouch wherein
(i) the spouted pouch comprises a flexible pouch body containing a cleaning liquid which dispenses via rigid pouch spout; and
(ii) the container is rigid and comprises a pouch chamber for holding said spouted pouch, and a pour spout,
characterized in that the rigid pouch spout and the container comprise respective engagement members;
the method comprising the steps of :
i. inserting the spouted pouch into the container pouch chamber
ii. engaging the respective engagement members such that the pouch spout is in fluid communication with the container pour spout
iii. dispensing of the cleaning liquid stored in the flexible pouch body via the container pour spout.

Various non-limiting embodiments of the invention will now be more particularly described with reference to the following figures in which:
Exemplary Formulations
Non-Limiting Examples of Laundry Treatment (Washing and Conditioning) Compositions According to Embodiments of the Invention as Described below.

Unless stated otherwise, all proportions are given in weight percent by weight of the total composition.
Exemplary Liquid Fabric Treatment (Conditioner) Compositions 1, 2 and 3

| Composition | 1 | 2 | 3 |
|---|---|---|---|
| Softener | | | |
| Soft TEA Quat* | 16.5 | 10 | 16.5 |
| Fatty alcohol** | — | 0.5 | |

-continued

| Composition | 1 | 2 | 3 |
|---|---|---|---|
| Other components | | | |
| Electrolyte (CaCl2) | 0.015 | 0.015 | 0.015 |
| Perfume | 1.00 | 1.00 | 1.00 |
| Water | to 100 | to 100 | to 100 |

*Soft TEA quat is a cationic softener based on triethanolamine with tallow and 15% IPA as solvent. Compositions 1 and 2: (VT-90 ex Stepan) Composition 3: Soft DEEDMAC (Armosoft DEQ ex Akzo)
**C16C18 fatty alcohol (Hydrenol D ex Cognis)

Exemplary Liquid Fabric Treatment (Washing) Composition

| Ingredient as 100% active | Wt % |
|---|---|
| Neodol 25-9* | 6-8 |
| Alcohol ethoxy sulfate | 12-15 |
| Linear alkylbenzene sulfonate | 6-9 |
| Sodium citrate, dihydrate | 3-6 |
| Propylene glycol | 4-8 |
| Sorbitol | 3-6 |
| Sodium tetraborate pentahydrate | 2-4 |
| Minor additives and water | to 100% |

*$C_{12}$-$C_{15}$ alkoxylated (9EO) chain group

In the figures, common reference numbers are used to denote corresponding/common features.

Figure 1A:
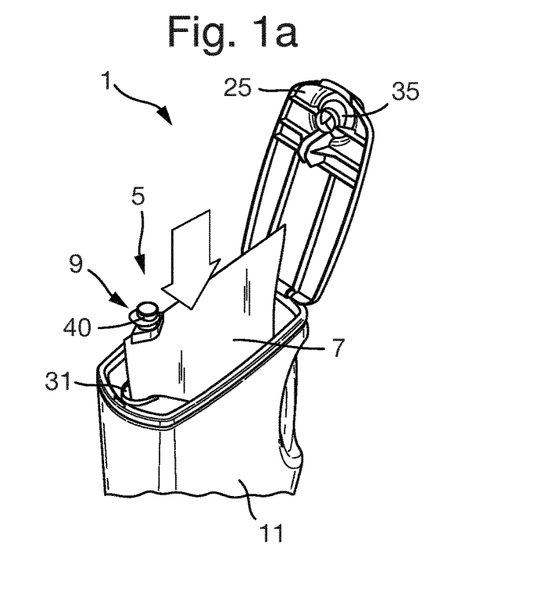
FIG. 1 is a perspective view of a dispensing system according to one embodiment of the present invention, shown in three stages of operation.
Figure 1B:
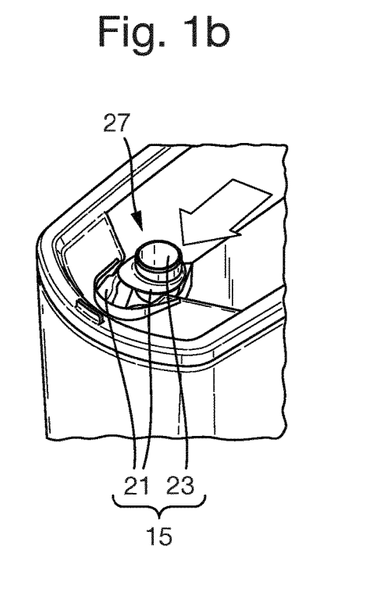
Figure 1C:
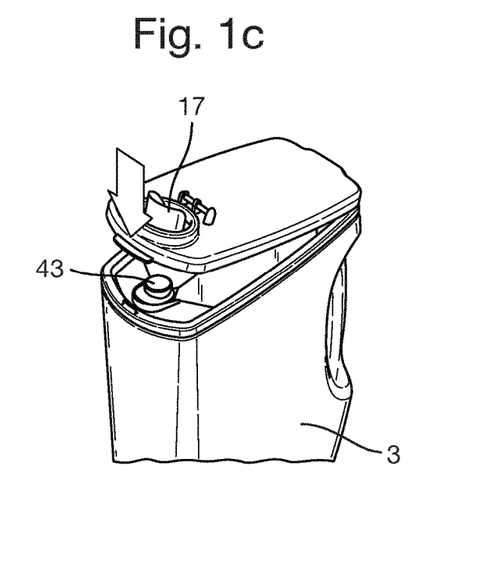

Referring to FIG. 1, a cleaning liquid dispensing system 1 is shown. The system 1 comprises the combination of a re-usable, rigid container 3 and a replaceable spouted pouch 5.
(i) the spouted pouch 5 comprises a flexible pouch body 7 containing a cleaning liquid (not shown) which dispenses from a rigid pouch spout 9; and
(ii) the container 3 and comprises a pouch chamber 11 for holding said spouted pouch 5, and a pour spout 17.

The rigid pouch spout 9 and the container 3 comprise respective engagement members 15 and by this engagement the pouch spout 9 is brought into fluid communication with the container pour spout 17 to allow dispensing of the cleaning liquid from the flexible pouch body 7.

The container 3 is a jug construction and includes a handle 19. The handle 19 is large and located on an opposing side to a pour spout 17. Generally the container 3 is an upright body with upright longitudinal axis with a low profile lid 25.

The container 3 and pouch spout 9 comprise respective pairs of rigid engagement members 15. These operate along substantially orthogonal and intersecting axis.

The rigid engagement members 15 comprise a respective pair of locating members 21, which engage to locate the pouch spout 9 in a position whereby a second pair of rigid engagement members: the fluid communication members 23 can be engaged for fluid intercommunication therebetween. The locating pair 21 engage in a transverse direction relative to the upright axis of the container 3 and the general direction of the engagement of fluid communication pair 23.

The container 3 comprises a lid 25 which is operable to overlie an aperture 27 in the pouch chamber 11 and also includes the container 3 pour spout 17.

Preferably the lid 25 is hinged relative to the pouch chamber 11 such that it is pivoted between a first position in which it overlies the aperture 27 and an open position in which it lies in an upright plane away from the aperture 27.

The respective engagement members 15 of the container 3 and the pouch spout 9 engage via snap-fit engagement. The locating pair 21 consists of a container recess 31 in an upper part of the pouch chamber on the aperture perimeter 29, which is configured to receive the respective rigid pouch spout collar 40 in snap-fit engagement. The recess is shaped to correspond with the circumferential shape of the pouch spout collar 40. The recess 31 is C-shaped (in plan view with the container 3 resting upright on a level surface) and comprises an annular gap which is dimensioned slightly smaller than the diameter of the pouch spout collar to allow the collar 40 to be pushed (by sliding transformation movement) into the recess 31.

The fluid intercommunication pair 23 comprises a lid engagement member 35, on the lid 25 and, configured for axial snap-fit engagement with the pouch spout 9 in a direction orthogonal to the axial direction of forces driving locational engagement. The lid engagement member 35 engages with the pouch spout to provide fluid communication therebetween. This also actuates an opening mechanism of the pouch spout 9. This may be by a cam-operated rotation of a opening mechanism or by breaking a frangible seal on the pouch spout. In other embodiments the user may additionally or alternatively remove a lid or seal to open the pouch.

Preferably the container engagement members and/or the engagement member of the pouch spout 9 comprise a resilient material, i.e. plastic to provide the snap fit engagement.

The lid engagement member 35 only engages when the lid 25 overlies the aperture and is in a level position.

The pouch spout collar 40 is on a upper part of the pouch spout 9, adjacent the pouch opening 43 and above the pouch spout weld fins/ribs. In this way the pouch spout 9 is located deeper into the pouch chamber 11 and the lid 25 can be flatter.

The liquid composition may be a flowable fabric or hard surface washing or treatment composition. The dispenser can be used to dispense the flowable composition into a washing machine or washing receptacle, and re-stored in the reservoir aperture after use. In the case of certain compositions e.g. liquid compositions, the dispenser may advantageously be rinsed e.g. by leaving the dispenser in the wash so that the rinse part of the cycle rinses the dispenser.

Figure 2A:
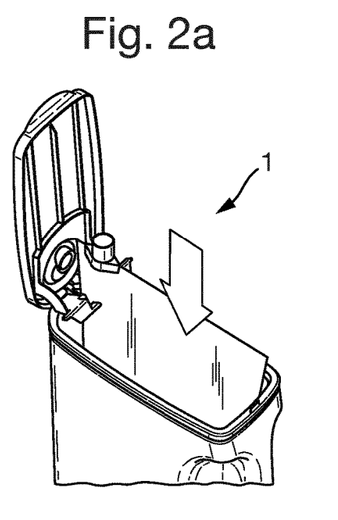
FIGS. 2-5 show further embodiments in perspective view, shown in similar stages of operation to FIG. 1.
Figure 2B:
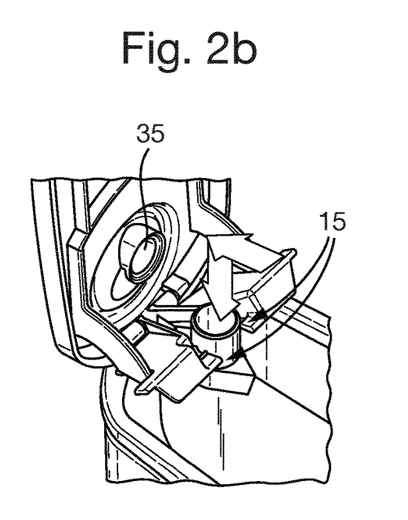
Figure 2C:
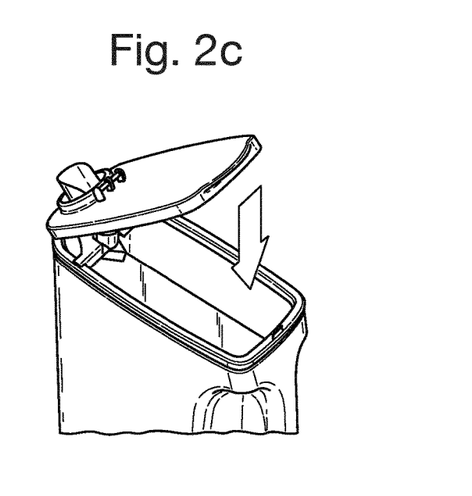
Figure 3A:
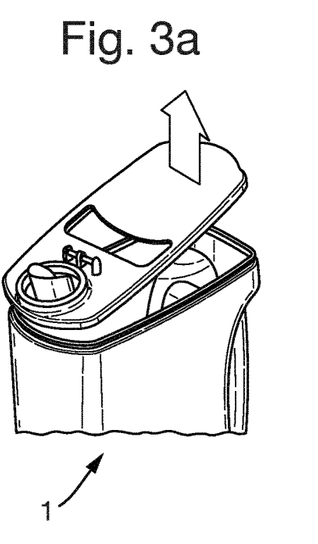
Figure 3B:
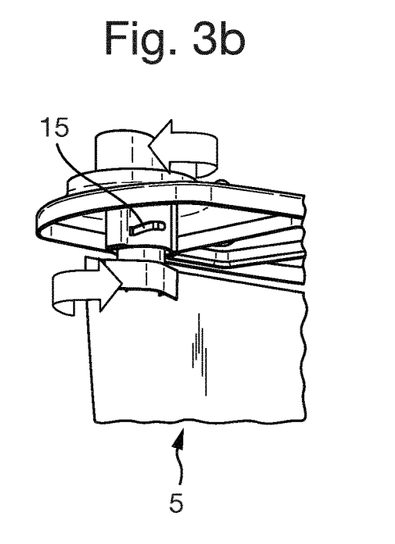
Figure 3C:
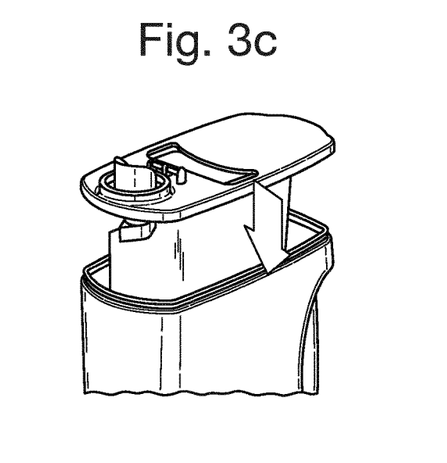
Figure 4A:
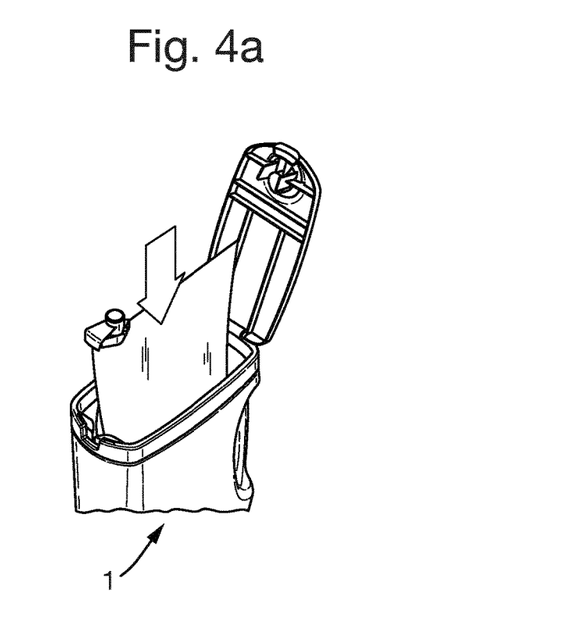
Figure 4B:
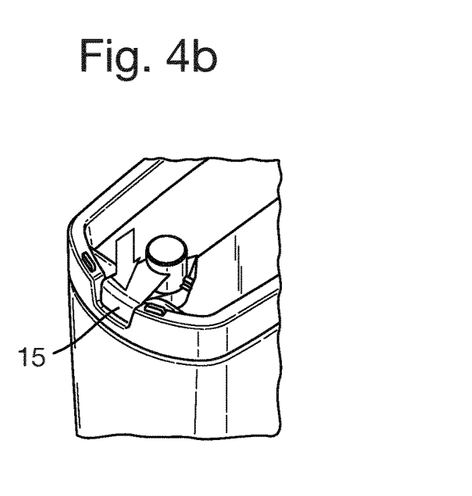
Figure 4C:
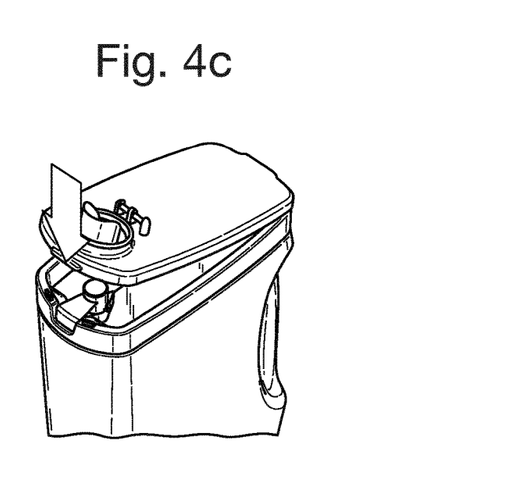
Figure 5A:
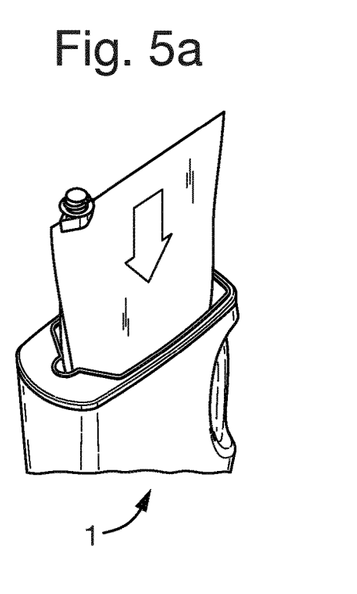
Figure 5B:
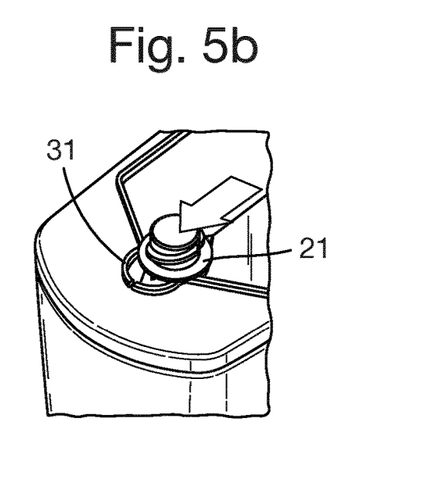
Figure 5C:
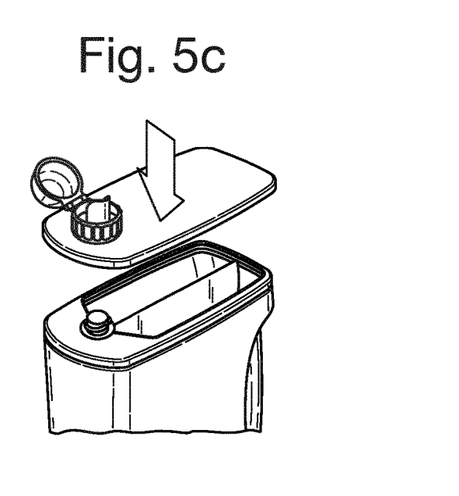
Figure 5D:
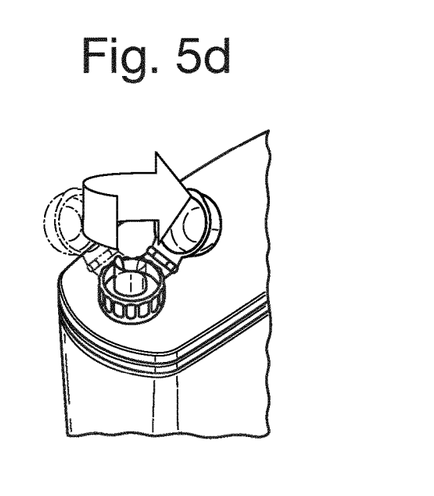
Figure 6A:
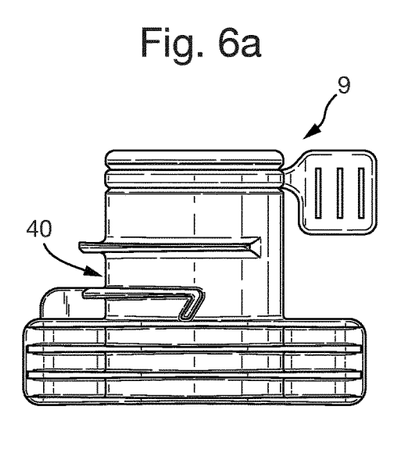
FIGS. 6a, 6b and 6c show close up side, front and plan views of the pouch spout of the embodiment shown in FIG. 1.
Figure 6B:
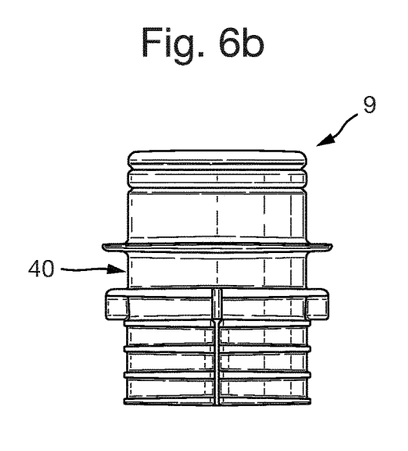
Figure 6C:
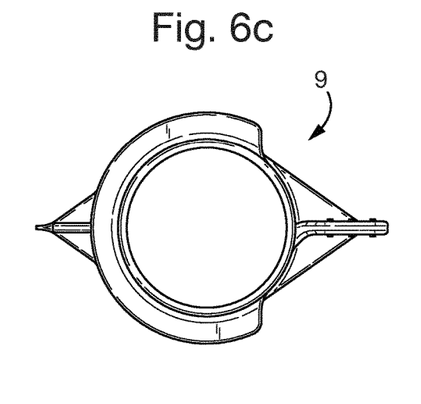

FIGS. 2-5 show further embodiments with different types of engagement. In FIG. 2 the pouch hangs from arms with are carried on the lid. The arms together support and locate the pouch in position. In this embodiment the pour spout is located adjacent the hinge of the lid. In FIG. 3 the pouch is attached to the lid by a screw-fit engagement which may terminate with a snap fit step. FIG. 4 shows a hook arrangement whereby the pouch comprises a hook engagement member with hooks onto the pouch chamber aperture perimeter. Finally FIG. 5 shows a similar embodiment to that of FIG. 1 wherein the pouch spout is locked to the lid after sliding engagement without snap fit engagement within the sliding movement.

In use, the spouted pouch 5 is inserted into the container 3 pouch chamber 11 engaging the respective engagement members 15 such that the pouch spout 9 is in fluid communication with the container 3 pour spout 17. The liquid is then dispensed from the pour spout as desired.

With this arrangement, dispensing is accurate and efficient. A flexible, thin-walled (and therefore more environment friendly) pouch can be used for packaging purchased frequently by the consumer but without the disadvantages of such packaging. Thus, whereas it can be difficult to achieve controlled pouring from an unwieldy pouch due to the fluidity of the body, when this pack is used within the system of the invention it is possible to achieve controlled pouring from the pour spout into a selected, small location such as a measuring cup or 'shuttle' or machine drawer or directly to a fabric stain prior to hand scrubbing/pre-treatment.

It is of course to be understood that the invention is not intended to be restricted to the details of the above embodiment which are described by way of example only.

The invention claimed is:

1. A cleaning liquid dispensing system comprising the combination of a re-usable container having an upright axis and a replaceable spouted pouch wherein
    (i) the spouted pouch comprises a flexible pouch body containing a cleaning liquid which dispenses from a rigid pouch spout; and
    (ii) the container is rigid and comprises a pouch chamber for holding said spouted pouch, and a pour spout, characterized in that the rigid pouch spout and the container comprise respective engagement members by which engagement the pouch spout is in fluid communication with the container pour spout to allow dispensing of the cleaning liquid stored in the flexible pouch body, wherein the container and pouch spout engagement members engage along substantially orthogonal and intersecting axis, the engagement members comprising a respective pair of locating members, the pair of locating members engaging by sliding movement in a transverse direction relative to the upright axis of the container.

2. A system according to claim 1 wherein the container comprises a lid and the lid includes the container pour spout.

3. A system according to claim 1 wherein the respective engagement members of the container and the pouch spout engage via snap-fit engagement.

4. A system according to claim 1 wherein the container engagement member comprises a recess in an upper part, said recess being configured to receive the rigid pouch spout in snap-fit engagement.

5. A system according to claim 1 wherein the container comprises a lid engagement member located on/in a lid.

6. A system according to claim 1 wherein the container and pouch engagement members comprise corresponding visual and/or tactile indicia to confirm correct engagement with the container engagement member.

7. A system according to claim 1 wherein the liquid composition is a multi-dose laundry liquid.

8. A spouted pouch for use with the system of claim 1, the pouch comprising a flexible pouch body containing a cleaning liquid which dispenses from a rigid pouch spout and characterized in the provision of an engagement member for engagement with a respective engagement member of the rigid container by which the pouch spout is in fluid communication with the pour spout to allow dispensing of the cleaning liquid stored in the flexible pouch body.

9. A re-usable, rigid container for use in the system of claim 1 said container for dispensing a cleaning liquid from a spouted pouch, the container comprising a pouch chamber and a pour spout and a handle characterized in the further provision of multiple engagement members for engagement with the rigid pouch spout by which said pouch spout is in fluid communication with the pour spout to allow dispensing of the cleaning liquid stored in the flexible pouch body.

10. A method of dispensing a cleaning liquid using a dispensing system comprising the combination of a reusable container and a replaceable spouted pouch wherein
   (i) the spouted pouch comprises a flexible pouch body containing a cleaning liquid which dispenses via rigid pouch spout; and
   (ii) the container has an upright axis, is rigid and comprises a pouch chamber for holding said spouted pouch, and a pour spout,
   characterized in that the rigid pouch spout and the container comprise respective engagement members which engage along substantially orthogonal and intersecting axis, the engagement members comprising a respective pair of locating members, the pair of locating members engaging by sliding movement in a transverse direction relative to the upright axis of the container;
   the method comprising the steps of:
   i. inserting the spouted pouch into the container pouch chamber
   ii. engaging the respective engagement members such that the pouch spout is in fluid communication with the container pour spout
   iii. dispensing of the cleaning liquid stored in the flexible pouch body via the container pour spout.

* * * * *